United States Patent [19]

Runde

[11] Patent Number: 5,526,554
[45] Date of Patent: Jun. 18, 1996

[54] DEVICE FOR CONNECTING MOVABLE ELEMENTS TO A VEHICLE BODY

[76] Inventor: Esgleas G. Runde, Numancia-91-3°, Barcelona, Spain, 08029

[21] Appl. No.: 351,709

[22] Filed: Dec. 8, 1994

[30] Foreign Application Priority Data

Dec. 14, 1993 [ES] Spain ..................... 9400093

[51] Int. Cl.⁶ .................. A44B 21/00; F16B 37/00
[52] U.S. Cl. .................. 24/525; 24/514; 24/569; 411/437
[58] Field of Search .............. 24/525, 569, 514, 24/68 CD; 411/437, 433, 166; 269/249, 143

[56] References Cited

U.S. PATENT DOCUMENTS

| | | | |
|---|---|---|---|
| 1,008,145 | 11/1911 | Heeter | 411/437 |
| 1,706,317 | 3/1929 | Oakes | 411/433 |
| 1,988,240 | 1/1935 | Ellis | 24/569 |
| 2,261,537 | 11/1941 | Bamarra | 411/437 |
| 3,443,831 | 5/1969 | Grange | 24/525 |
| 3,757,591 | 9/1973 | Taylor | 411/437 |
| 3,878,757 | 4/1975 | Puklus, Jr. | 411/433 |
| 5,353,826 | 10/1994 | Davis, Sr. | 24/514 |

*Primary Examiner*—Victor N. Sakran
*Attorney, Agent, or Firm*—Jacobson, Price, Holman & Stern

[57] ABSTRACT

A device for connecting movable elements such as wheelchairs or gurneys to a vehicle body for transportation has a clamping assembly mounted on a threaded rod which is secured to the vehicle body at its one end. The clamping assembly includes a fork member for engaging the movable element and a nut coupled to the fork member. The nut has a threaded bore and an intersecting inclined passing bore of larger diameter. When the device is not under load, the nut can be tilted so that the assembly can slide easily along the rod via the passing bore. When the assembly is under load the nut is locked on the rod via the threaded bore.

3 Claims, 2 Drawing Sheets

DEVICE FOR CONNECTING MOVABLE ELEMENTS TO A VEHICLE BODY

BACKGROUND OF THE INVENTION

This invention relates to a device for the rapid connection of movable elements to a vehicle body, for transportation of said elements.

Problems are encountered in securing various types of freight items or passengers in vehicles, for example wheelchair-borne passengers, passengers on gurneys or non-conventional seating, which require fixing means which are secure but easily released in an emergency.

Most of the known fixing means tend to be complex and unwieldy. These drawbacks are substantially eliminated by the inventive rapid connection device, which is distinguished by its mechanical simplicity, speed of operation, and low manufacturing cost.

SUMMARY OF THE INVENTION

The inventive device comprises a clamping assembly that includes a combination of a nut and a fork element which, when not under load, can be freely displaced without requiring screwing, along a threaded rod secured to the vehicle, as if said combination were a loose bushing; but when the system is under load, the combination is locked to the rod and must be rotated in order to move it up or down on the rod.

BRIEF DESCRIPTION OF THE DRAWINGS

To facilitate a more detailed explanation of the invention, two drawing figures are provided which illustrate a practical embodiment of inventive fixing system; these being provided for purposes of illustration only and not limiting the scope of the invention.

DESCRIPTION OF PREFERRED EMBODIMENT

Figure 1:
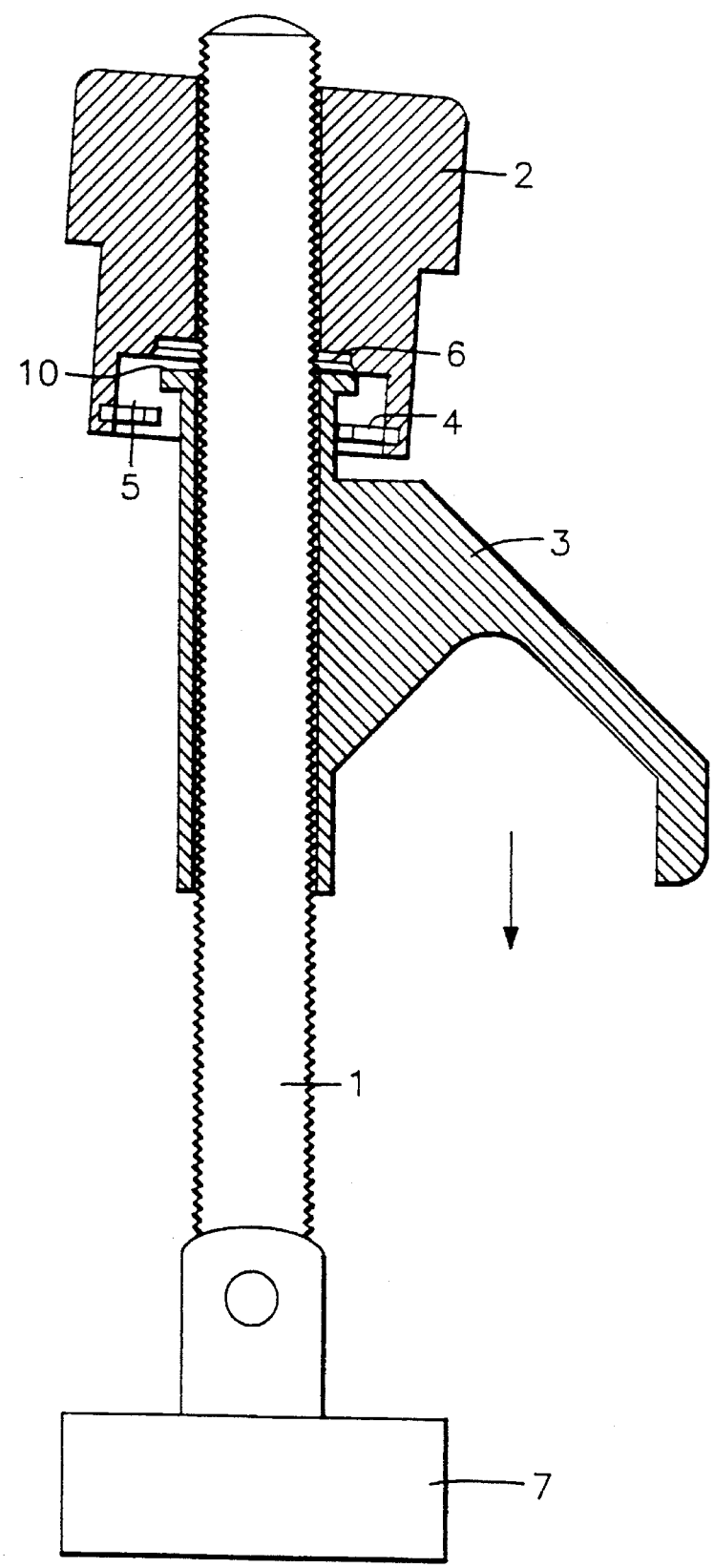
FIG. 1 is a vertical cross sectional view of a connecting device according to the invention, with the system not under load.

The device shown in the drawings is comprised of a clamping assembly and a threaded rod 1 fixed to the body of a vehicle, not shown, by means of a base 7. A nut element 2 is provided which can be displaced along rod 1. Nut 2 is connected to a fork element 3 which engages an item to be fixed in the vehicle.

This rapid connection device is distinguished by the design of the nut element 2 and fork element 3, and the relation of these elements to the rod 1. The nut 2 can be displaced along the threaded rod by screw action when the nut is essentially aligned with the rod and by sliding action when the nut is tilted at a certain angle to the rod. To this end, the nut element 2 is provided with a threaded bore 9 and an inclined "passing bore" or sliding bore 8, (FIG. 2) which extends through the nut 2, and the axis of which "passing bore" intersects and forms an angle of 2–15 degrees with the threaded bore 9. The diameter of the "passing bore" 8 is greater than that of the threaded rod 1.

The nut element 2 has an aperture 5 which accommodates an upper part of the fork element 3 which engages in the nut 2. Said upper part of the fork element 3 is held in aperture 5 by a retainer 4 inserted in the nut 2, whereby the nut 2 and fork element 3 are interengaged to form a pivoting connection such that they can be displaced, rotated, and flexed with respect to each other, within certain limitations.

Nut 2 also has a recess 6 coaxial with the threaded bore of nut 2, to accommodate a flange 10 at the upper end of the fork member 3.

In FIG. 1, with the system not under load, the fork member 3 is in a position in which it can be displaced within aperture 5 of the nut 2. When this is done the recess 6 of nut 2 is not occupied, the nut 2 can be inclined until the inclined "passing bore" 8 of the nut coincides with the axis of the threaded rod 1. Consequently the combination formed by the nut 2 and fork member 3 can be freely displaced along the rod 1.

Figure 2:
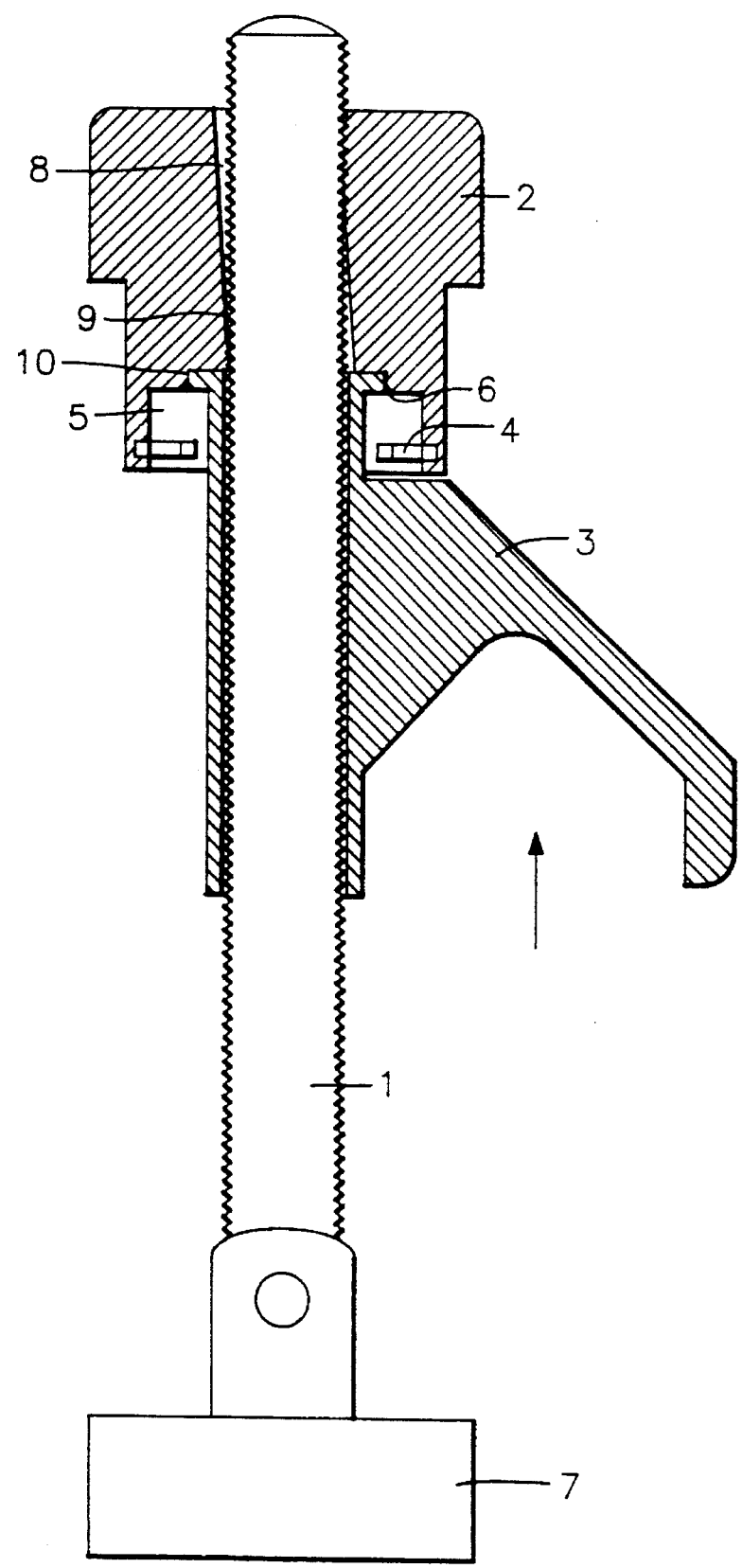
FIG. 2 is a vertical cross sectional view of the device, with the system under load.

In FIG. 2, with the system under load, the flange 10 of the fork member 3 penetrates into the recess 6 which recess is coaxial with the threaded bore in the nut 2, so that the axis of the threaded rod 1 coincides with the axis of the threaded bore 9 of the nut 2, and thereby the connection of the nut 2 and fork member 3 becomes locked and the nut 2 must be rotated in order to advance the combination of nut 2 and fork member 3 along the rod 1. Such threaded advance enables the development of a clamping force necessary to fix an item to be transported.

While only a preferred embodiment of the invention has been described herein in detail, the invention is not limited thereby and modifications can be made within the scope of the attached claims.

I claim:

1. A device for connecting a movable element to a vehicle body, for transportation, comprising a threaded rod, mounting means on one end of the rod for securing same to a vehicle body, and a clamping assembly mounted for displacement along said rod; the clamping assembly including a nut having a threaded bore for inclined through-passage in the nut and having an axis which intersects with an axis of the threaded bore, the passing bore having a diameter greater than that of the threaded rod associated with said nut whereby the nut can be tilted when the clamping assembly is not under load to align the passing bore with the threaded rod and allow the clamping assembly to slide along the rod, wherein the clamping assembly includes a fork member for engaging the movable element and coupling means connecting the nut and the fork member together on the rod for relative movement allowing the nut to be tilted when the assembly is not under load and for locking the nut on the rod for threaded movement thereon through said threaded bore when the assembly is loaded, wherein the coupling means comprises an aperture in the nut receiving an end portion of the fork member which embraces the rod, a recess in the nut opening into said aperture and a locking flange on said end portion of the fork member to fit in said recess when the assembly is under load.

2. A device according to claim 1 wherein the axis of the passing bore is inclined at 2–15 degrees to the axis of the threaded bore.

3. A device according to claim 1 which includes a retainer in said aperture for holding said end portion of the fork member in said aperture.

* * * * *